US005594937A

United States Patent [19]
Stiles et al.

[11] Patent Number: 5,594,937
[45] Date of Patent: Jan. 14, 1997

[54] SYSTEM FOR THE TRANSMISSION AND RECEPTION OF DIRECTIONAL RADIO SIGNALS UTILIZING A GIGAHERTZ IMPLOSION CONCEPT

[75] Inventors: Walter J. Stiles, Phoenix; Milford G. Richey, Chandler; Perry W. Haddon, Tempe, all of Ariz.; Malcolm I. Ziegler, Walnut Creek, Calif.

[73] Assignee: GHZ Equipment Company, Tempe, Ariz.

[21] Appl. No.: 300,598

[22] Filed: Sep. 2, 1994

[51] Int. Cl.$^6$ ...................................................... H04H 1/00
[52] U.S. Cl. ........................... 455/5.1; 455/6.2; 455/6.3; 455/51.1; 348/10; 348/12
[58] Field of Search .................................... 455/33.1, 33.2, 455/51.2, 56.1, 4.2, 3.1, 3.2, 511, 6.1, 6.3, 269, 270, 102, 103, 47, 104, 129, 59, 51.1, 33.3; 348/7–12; 379/88, 58; 343/758

[56] References Cited

U.S. PATENT DOCUMENTS

| | | |
|---|---|---|
| 3,882,393 | 5/1975 | Epstein . |
| 4,220,923 | 9/1980 | Pelchat et al. . |
| 4,313,220 | 1/1982 | Lo et al. . |
| 4,321,705 | 3/1982 | Namiki . |
| 4,355,411 | 10/1982 | Reudink et al. ........................ 455/33.2 |
| 4,495,648 | 1/1985 | Giger . |
| 4,521,878 | 6/1985 | Toyonaga . |
| 4,525,861 | 6/1985 | Freeburg . |
| 4,528,656 | 7/1985 | Morais . |
| 4,591,906 | 5/1986 | Morales-Garza et al. . |
| 4,747,160 | 5/1988 | Bossard . |
| 4,791,428 | 12/1988 | Anderson .............................. 343/758 |
| 4,928,177 | 5/1990 | Martinez . |
| 4,932,049 | 6/1990 | Lee ........................................ 455/33.3 |
| 4,955,083 | 9/1990 | Phillips et al. ......................... 455/102 |
| 5,038,403 | 8/1991 | Leitch ................................... 455/51.2 |
| 5,046,124 | 9/1991 | Wu et al. .............................. 455/51.1 |
| 5,051,822 | 9/1991 | Rhoades ................................ 455/6.3 |
| 5,058,150 | 10/1991 | Kang .................................... 379/88 |
| 5,073,971 | 12/1991 | Schaeffer . |
| 5,101,267 | 3/1992 | Morales-Garza . |
| 5,177,604 | 1/1993 | Martinez . |
| 5,223,923 | 6/1993 | Morales-Garza . |
| 5,257,099 | 10/1993 | Morales-Garza . |
| 5,263,078 | 11/1993 | Takahashi et al. ..................... 379/88 |
| 5,301,359 | 4/1994 | Van den Heuvel et al. . |
| 5,303,287 | 4/1994 | Laborde . |
| 5,307,507 | 4/1994 | Kanai . |
| 5,319,455 | 6/1994 | Hoarty et al. ......................... 455/4.2 |
| 5,437,052 | 7/1995 | Hemmie et al. ....................... 455/6.1 |

OTHER PUBLICATIONS

"Block DownConverters for Wireless CATV", Le–Ngoc et al., IEEE Transactions on Consumer Electronics, vol. 35, No. 4, Nov. 1989, pp. 827–830.

Primary Examiner—Andrew Faile
Attorney, Agent, or Firm—Richards, Medlock & Andrews

[57] ABSTRACT

A system for providing enhanced multi-function, simplex or duplex RF wireless coverage of a service area, while operating at gigahertz frequencies, employing audio, video or telemetry programming, or any combination thereof; using AM, FM, Digital or Single Sideband modulation, or any combination thereof; from multiple transmitting sites located in a pattern around the outer perimeter of the service area to be provided coverage. All RF transmitter stations assigned to a given service area are fed substantially identical programming with each station employing a directional transmitting antenna thus producing a service area and thereby providing the basic implosion characteristics of the system. A highly directional antenna is employed at each customer's receiving location focused on its optimum transmission site. System vertical, horizontal or circular antenna polarization compatibility provides service area coverage consistent with minimum interference and signal distortion. A choice of three types of subscriber interface devices provides: Option (a) one-way incoming signal reception only; Option (b) incoming signal reception plus an outgoing return capability for, but not limited to, telephone and other two-way interactive services such as facsimile, and computer networking services, games of skill, telebanking, teleshopping, teleconferencing and pay-per-view television program services; Option (c) provides all of the features of Option (b) plus a built-in two-way facsimile communications system and a telephone answering machine for incoming calls as part of the subscriber interface package.

13 Claims, 13 Drawing Sheets

SYSTEM FOR THE TRANSMISSION AND RECEPTION OF DIRECTIONAL RADIO SIGNALS UTILIZING A GIGAHERTZ IMPLOSION CONCEPT

FIELD OF THE INVENTION

The present invention relates generally to the one or two way transmission and reception of radio frequency signals and more particularly to providing low power wireless two-way multi-point to multi-point distribution of the radio frequency (RF) signals for programming containing audio, video or telemetry, or any combination thereof to a service area while employing AM, FM, Single Sideband, Digital modulation, or any combination thereof.

BACKGROUND OF THE INVENTION

A broadcasting system for radio signals that can be utilized in audio, video or telemetry is desired for many applications. For example, this type of system would be extremely useful for low power wireless television systems. In addition, it is known that more spectrum is available particularly at the higher frequencies (gigahertz frequencies). It is also known that such higher frequency gigahertz systems have certain transmission issues exacerbated due to their short wavelength. For example, one issue with such gigahertz transmissions is rainfall attenuation. Also, high transmitter power levels are difficult and expensive to generate at gigahertz frequencies.

Another issue is the requirement of a clear line of sight (LOS) path between the transmitting and receiving antennas when operating at gigahertz frequencies. The traditional approach to deal with this LOS requirement is to provide service from the top of the highest building (or tower) within the service area proper, using an omni-directional transmitting antenna. This traditional approach will often not be able to provide adequate total LOS coverage of the service area.

A multi-million dollar example of the risks associated with the loss of LOS under the traditional approach was the forced relocation of the high-power VHF/UHF commercial television stations, originally located atop the 102-story, 1,250' high Empire State Building in New York City, to the 110-floor, twin tower, 1,360' World Trade Center. While the difference in overall height of the buildings was only 110', the huge TV reception shadow cast behind the twin towers' constant cross-section structure was too massive to be tolerated and most of the Empire State site's TV antennas had to be moved. The Empire State Building now casts a shadow of its own, which damages direct incoming TV signal quality from the World Trade Center antennas in this new shadowed area, but to a far lesser extent due in part to the slender architectural shape of the Empire State Building's upper floors.

Existing wireless cable systems are known that employ polarization diversity to decrease interference distortion. Such a system would utilize an array of transmitters such that horizontally and vertically polarized omni-directional antennas alternate throughout the system. In such a system, each receiver with its appropriate narrow beam width antenna is directed at a specific transmitting antenna and is aligned to receive signals of the frequency and polarization of that transmitting antenna. Such a prior art system concerns itself with providing antennas of a specific polarization to improve reception. It is not concerned with or directed to the issues with LOS associated with high frequency transmissions. Accordingly, in those environments where the transmission paths were not LOS, the above-identified disclosure would still have serious coverage problems associated therewith.

What is needed therefore, is a system and method in which a broadcast system (audio, video or telemetry) can operate to provide extensive coverage of a particular service area. The method and system should be such that it can be easily implemented. Finally, the system should be a practical and cost effective solution to providing such broadcasting signals at high frequencies (1 gigahertz and greater); and to reduce reception problems due to loss of LOS which can be the result of structures, terrain, etc. The present invention addresses such a need.

SUMMARY OF THE INVENTION

A broadcast system is provided that utilizes a plurality of RF transmit sites. These transmit sites are pointed inward and are located to provide the maximum practical percentage of coverage for the population within the broadcast system's desired service area. Through the present invention, each receiver within the service area will have access to multiple transmit sites. Through the "implosion" of signals into the service area, improved line of sight reception will be provided. The present invention employs a Gigahertz Implosion Concept to address the needs of traditional broadcasting systems.

All of the transmitting sites employ directional antennas and are fed substantially identical (time-phased where applicable) programming simultaneously from common or multiple sources. The use of multiple transmitting locations add a substantial long-term service insurance. Such insurance is not guaranteed by the traditional system which attempts to provide a like service from the top of the highest point within the service area, using an omni-directional transmitting antenna, as in the Empire State Building example.

A fluid analogy to the operation of the present invention is the practice of mounting multiple directional, and overlapping, water sprinkler heads, generally facing inward from around the outer perimeter of a lawn to provide maximum watering coverage, as compared to locating a single large, omni-directional sprinkler head at the highest central location of the tallest roof peak on the property.

In one aspect of the present invention a system for broadcasting programming to a service area comprises a plurality of transmitters. Each of the transmitters broadcast a high frequency, directional signal and include a head end transmit antenna. Each of the transmitters are also being fed substantially identical programming. The plurality of transmitters are located such that the service area is substantially covered by the plurality of high frequency directional signals that are being transmitted.

The system also includes a plurality of subscriber receivers capable of receiving a plurality of high frequency directional signals from the plurality of transmitters. Such subscriber receivers includes a subscriber receiver antenna for detecting the strongest high frequency directional signal received from the plurality of transmitters.

A system in accordance with the present invention can be adapted to provide one way or two way transmission. The system in accordance with the present invention can be utilized effectively in interactive or so-called multimedia systems.

The use of the gigahertz RF signals in conjunction with the present invention provides additional advantages as far as the head end transmit antenna is concerned. At high frequencies such as in the gigahertz range, the antenna is much smaller and lighter and can have a significant power gain over the omni-type antenna nominally associated with the above identified traditional single transmitter locations. High transmitter power levels are expensive to generate at gigahertz frequencies, which makes providing the highest practical transmitter antenna gains of great financial importance.

The present invention employs a directional antenna at each transmitter site. Assuming a three-transmitter site installation utilizing 120° transmit antennas, an additional 4 dbi of gain is derived solely from the directionalization of the horizontal radiation pattern of the transmit antenna. This 4 dbi gain over omni-directional antennas is numerically additive to the typical 14 dbi antenna gain, depending upon the frequency, provided by the compression of the vertical lobe pattern. Accordingly, the overall increased antenna gain greatly increases the performance of the broadcasting system. This narrow reception lobe provides all the reception gain and orientation selectivity that is nominally required even during periods of high winds and normal rainfall. Multipath distortion, insufficient co-channel isolation and other interference rejections are built-in assets of the fine tuning subscriber receive antenna installation procedures.

The optimum incoming RF signal is received by the highly directional planar or parabolic subscriber receive antenna. A subscriber interface device, including a set-top converter, employed for one-way incoming signal reception, plus a transmitting return signal capability, has two antenna terminals. The first antenna terminal, being identical to the preceding discussion of subscriber interface device, is used for receiving only, while the second antenna terminal is used for transmitting only. The latter is connected to a separate return path. This subscriber interface device also provides a telephone handset including a dialing pad built into the handle for use at the location of the converter. Two modular female line receptacles for patching in a more remotely located telephone handset plus an additional instrument, such as a telephone answering machine or a two-way facsimile machine, are also provided.

The deluxe type set-top converter duplicates all the features provided by the above-mentioned set top converter. In addition, a built-in combination two-way facsimile machine plus a telephone answering machine is included as subscriber interface devices.

DETAILED DESCRIPTION OF THE DRAWINGS

The present invention relates to an improvement in the broadcasting of high frequency radio signals in the gigahertz frequency range. The following description is presented to enable one of ordinary skill in the art to make and use the invention and is presented in the context of a particular application and its requirements. Various modifications to the preferred embodiment will be readily apparent to those of ordinary skill in the art, and the generic principles defined herein may be applied to other embodiments and applications without departing from the spirit and scope of the present invention. Thus the present invention is not to be limited to the embodiment shown, but is to be accorded with the widest scope consistent with the principles and features disclosed herein.

Figure 1:
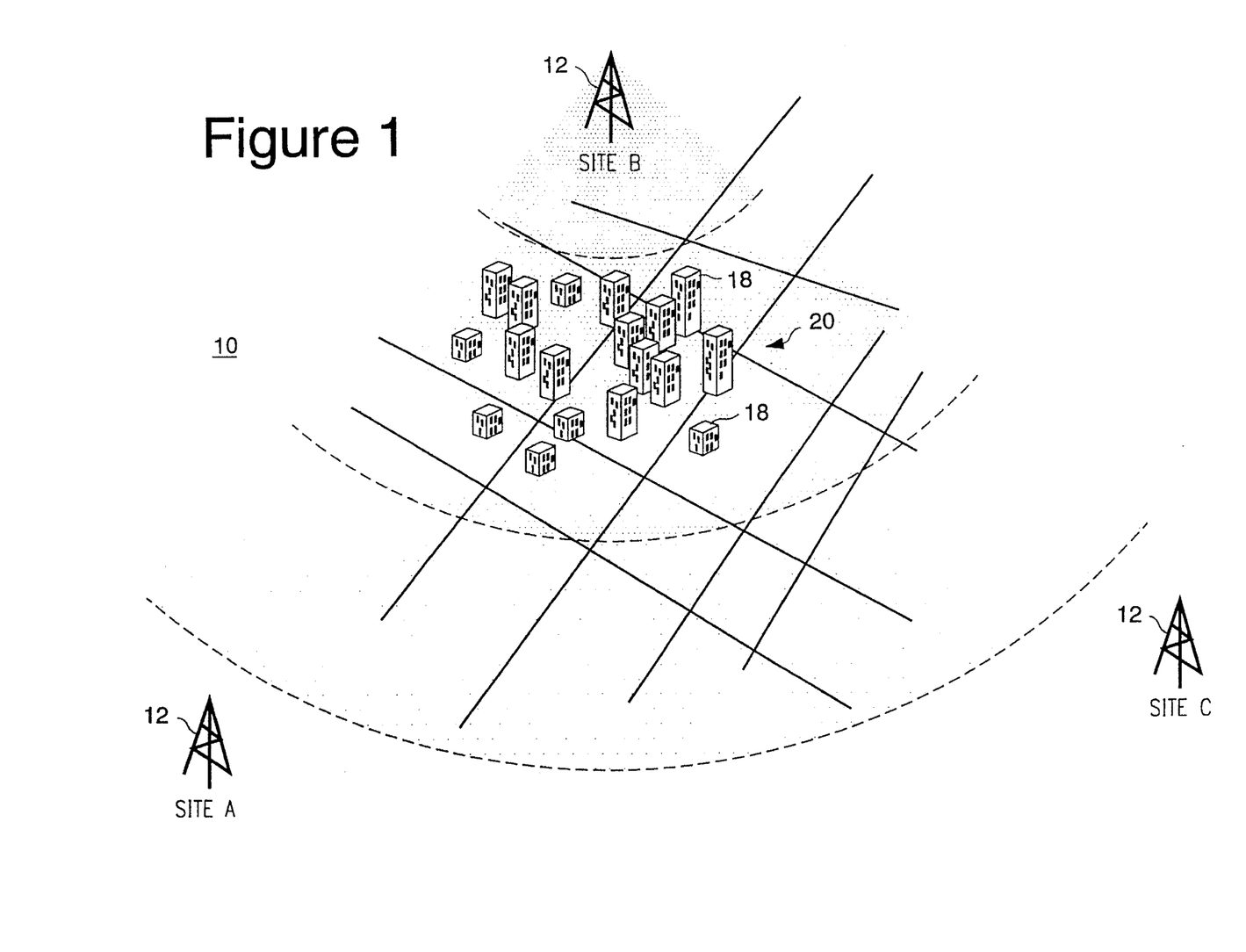
FIG. 1 is a block diagram of a broadcast system in accordance with the present invention.

Referring now to FIG. 1 what is shown is a broadcasting system 10 which employs the Gigahertz Implosion Concept in accordance with the present invention. The system 10 includes a plurality of head end transmitting sites 12 which provide signals to subscriber receivers 18 in the service area 20. All head end transmitting sites 12 assigned to a given service area are fed identical programming simultaneously from a common or multiple source—time phased where applicable—with each site typically employing a directional transmitting antenna providing half-power (3 db) field intensity radiation points at +60° and −60°, thus producing a perimeter service area zone coverage of 120°.

A directional antenna is employed at each subscriber receiver 18 location focused on its optimized transmission site. System vertical, horizontal or circular antenna polarization compatibility provides maximum population and service area coverage consistent with minimum interference and signal distortion. It should be noted that although three transmitting sites 12 are shown, any number of sites could be utilized in any implosion configuration as long as the maximum service area is covered and that use would be within the spirit and scope of the present invention.

An analogy to the operation of the present invention is the practice of mounting multiple directional, and overlapping, water sprinkler heads, generally facing inward from around the outer perimeter of a lawn to provide maximum watering coverage, as compared to locating a single large, omni-directional sprinkler head at the highest central location of the tallest roof peak on the property.

Reducing the number of head end transmitting sites 12 to the least common denominator is obviously a major economic consideration. While a particular service area could probably be served by only two (2) transmitting sites, generally imploding at each other, it still remains reasonable to assume that at least three (3) such stations would be required. Such stations located in a triangular, circular or other pattern around the outer perimeter of a designated service area appear to be the most cost effective solution utilizing present technology.

It should be understood, however that there is no reasonable limit to the number of head end transmitting sites 12 that can be employed to serve extremely large service areas other than the overall system's cost effectiveness.

The range of frequencies at which the implosion concept is designed to be most efficiently matched to the state of the television wireless video distribution art, for example, extends from the Ultra High Frequencies UHF (1000–3000 Mhz), through the Super High Frequency range SHF (30–300 GHz). All frequencies above 1 GHz are considered as line-of-sight (LOS) operations. Federal Communications Commission (FCC) allocation policy will obviously dictate the final practical perimeters of the frequency range at which the present invention can be most effective in serving the "public's interest, convenience and necessity." There are frequency ranges currently under study and development by the FCC for multi-point to multi-point wireless cable use within the 1 GHz to 300 GHz range.

The earth's curvature effect on LOS operations from various transmitter tower heights, assuming a receiving antenna height of 30 feet, is indicated as providing service area coverage distances of:
600' tower=42 miles max.
500' tower=39 miles max.
400' tower=36 miles max.
300' tower=32 miles max.
200' tower=27 miles max.
150' tower=23 miles max.

Figure 2:
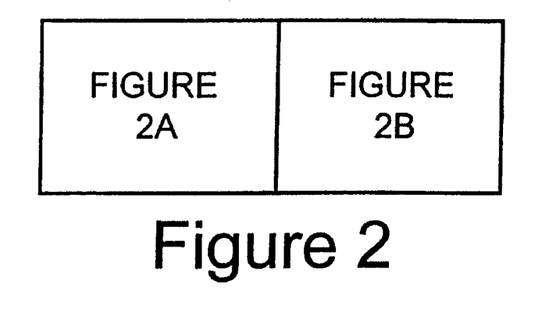
FIG. 2 is a block diagram of a first embodiment of a head end transmitter (local) utilized in the system of FIG. 1.
Figure 2A:
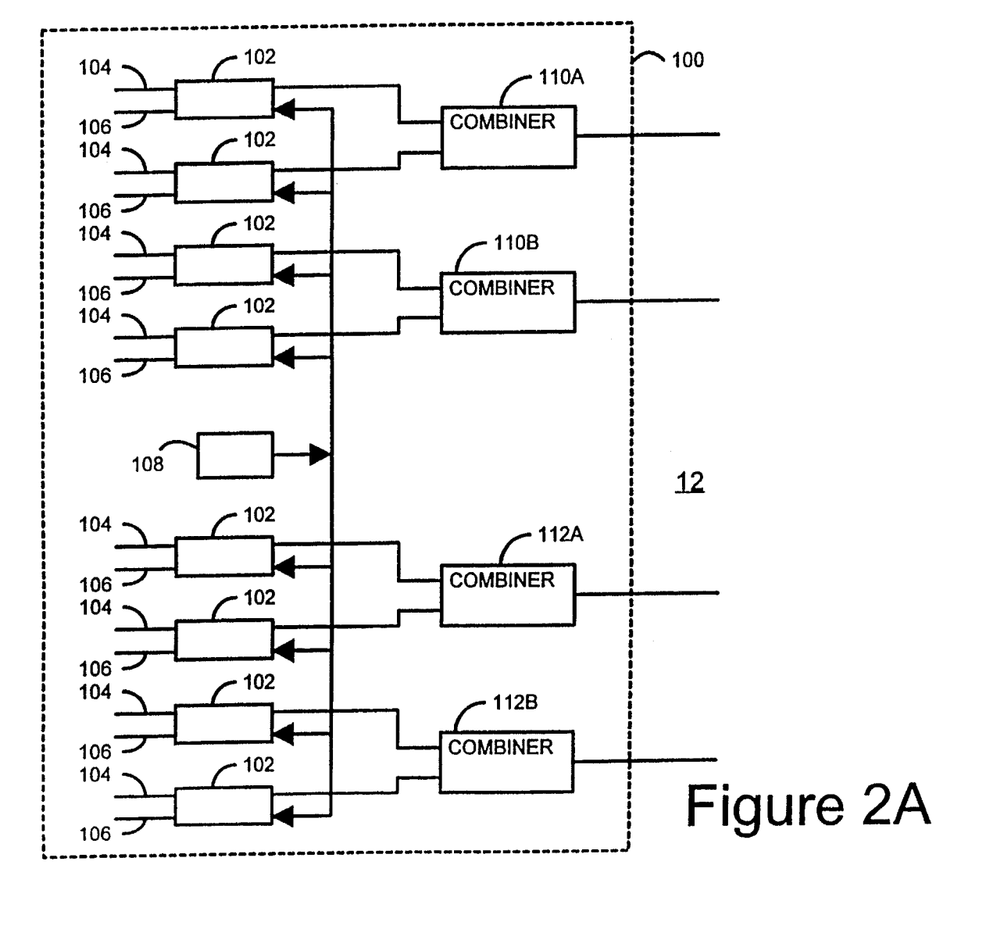
Figure 2B:
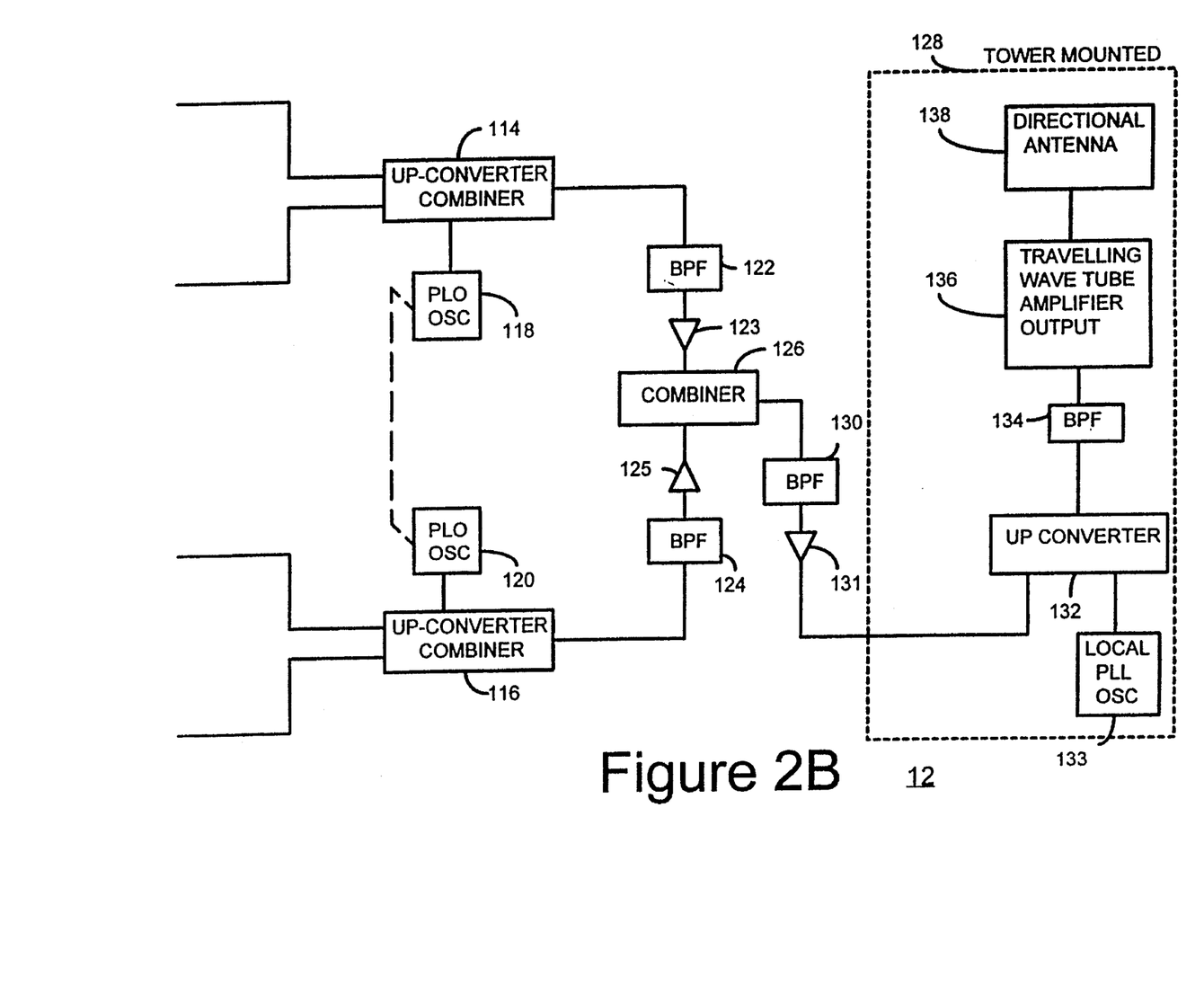

With the above parameters in mind, to more particularly describe the operation of the head end transmitting sites 12 of FIG. 1 refer now to FIG. 2 which is a block diagram of a multipath channel head end transmitting site 12 which operates in the gigahertz (GHz) frequency range. The head end transmitting site 12 includes a collocated programmed exciter and processing equipment 100. The collocated programmed exciter and processing equipment 100 further includes a plurality of channels 102. Each of the channels includes an audio input 104 and a video input 106.

In this embodiment as is seen, channel 1 is provided with a proper (MHz) frequency bandwidth and the frequency of each succeeding channel increases sequentially by the same bandwidth.

The frequency of each of the channels are locked by oscillator source 108. The signals from the lower channels are combined via combiners 110a and 110b. The signals from the upper channels are combined via combiners 112a and 112b. The resultant signals are then provided to up-converter combiners 114 and 116, respectively. The frequency of the signals from the up converter combiners 114 and 116, which use local oscillators 118 and 120 respectively to obtain the proper intermediate combiner output frequency.

The signal from the up converter combiners 114 and 116 are provided to band pass filters (BPF) 122 and 124, respectively. The signals are then amplified by amplifiers 123 and 125, respectively. All of the signals are then combined at combiner 126 and provided to the directional antenna system 128 via a BPF 130 and amplifier 131. The signal is then up converted to the desired output GHz frequency range via an up converter 132 and oscillator 133. This up converted signal is then filtered by BPF 134 and then amplified by amplifier 136. This amplified signal is then provided to the directional antenna 138 which in turn radiates the RF broadcast signals into the service area.

The above describes the operation of one type of head end transmitting site 12. In a second embodiment, the antenna system is located remotely from collocated programmed exciter and processing equipment 100 of the head end transmitting site 12. To more particularly describe the operation of a head end transmitting site 12 with a remote antenna system, refer now to FIG. 3 which is a block diagram of a multiple channel head end transmitting site 12' with a remote head end transmitting system 128' which operates in a desired gigahertz (GHz) frequency range.

Figure 3:
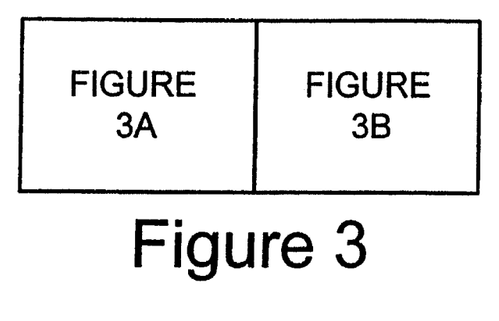
FIG. 3 is a block diagram of a second embodiment of a head end transmitter (remote) utilized in the system of FIG. 1.
Figure 3A:
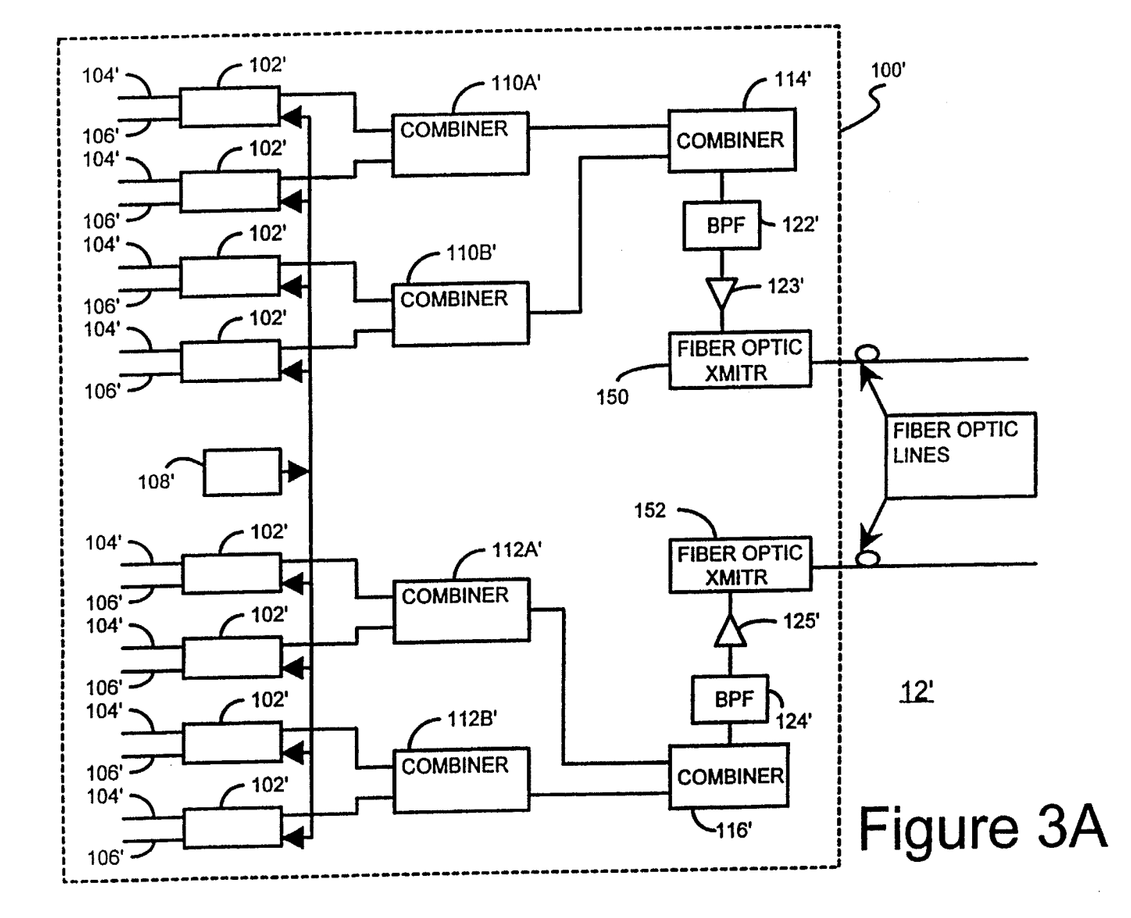
Figure 3B:
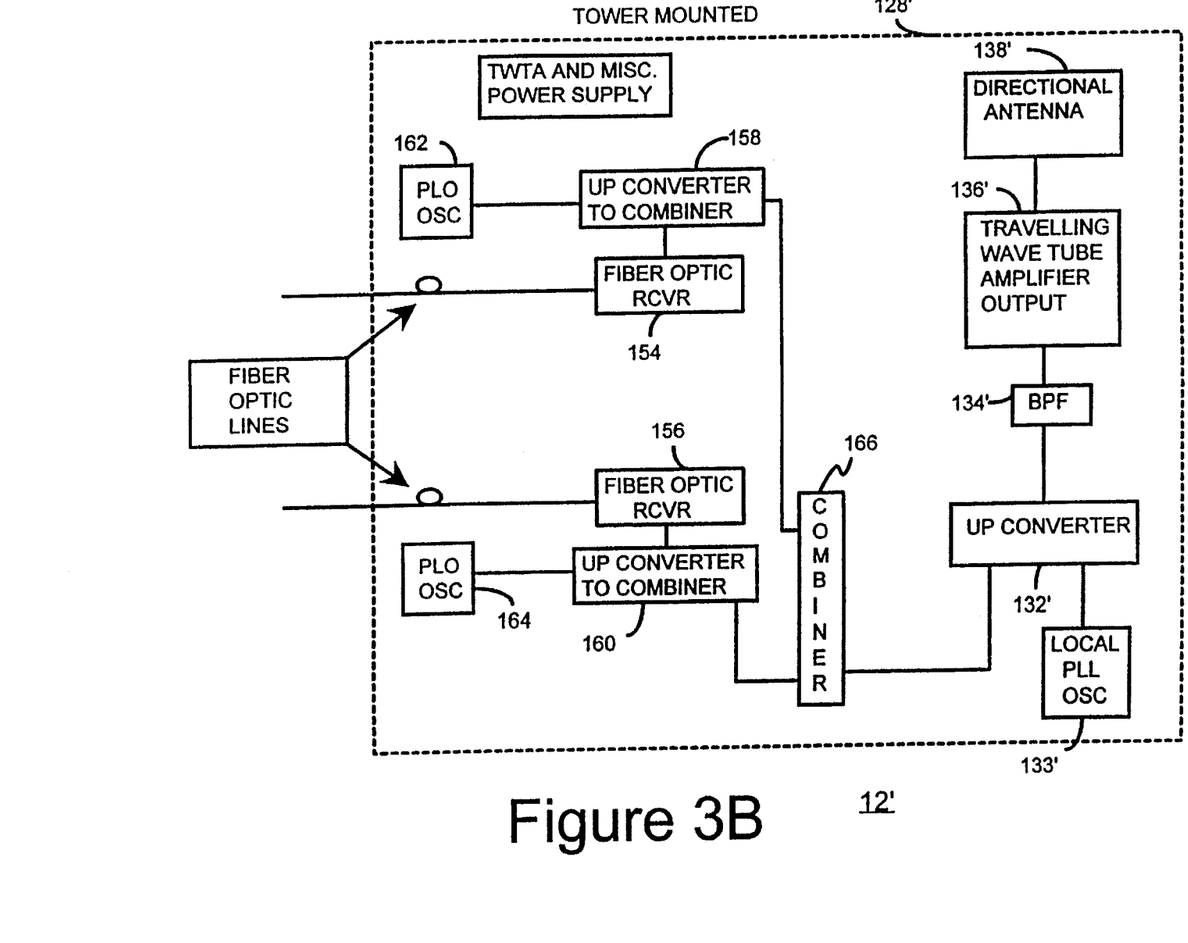

As is seen, the head end transmitting site 12' has many of the same elements as those described with reference to head end transmitting site 12 of FIG. 2 and also has the additional elements of transmitters 150 and 152 which can receive the signals from the head end transmitting site 12. In a preferred embodiment the transmitters 150 and 152 would comprise fiber optic transmitters. This type of head end transmitting site 12' could then be utilized with an antenna system wherein the distance between the programmed exciter and processing equipment 100' and the remote head end transmitting system 128' can be a significant distance apart.

Accordingly the remote head end transmitting system 128' would include receiver 154 and 156, which are fiber optic receivers. Each of the receivers 154 and 156 are in turn coupled to up converters 158 and 160, respectively. The frequency of the signals to the up converters 158 and 160 are in turn locked by oscillators 162 and 164, respectively. The remainder of the remote head end transmitting system 128' operates as described with respect to the directional antenna system 128 of FIG. 2.

In another embodiment, several remote head end transmitting systems 128' can be utilized to receive audio and video information remotely from head end transmitting sites 12, and the other antenna system 128 are collocated with transmitting sites 12.

Figure 4:
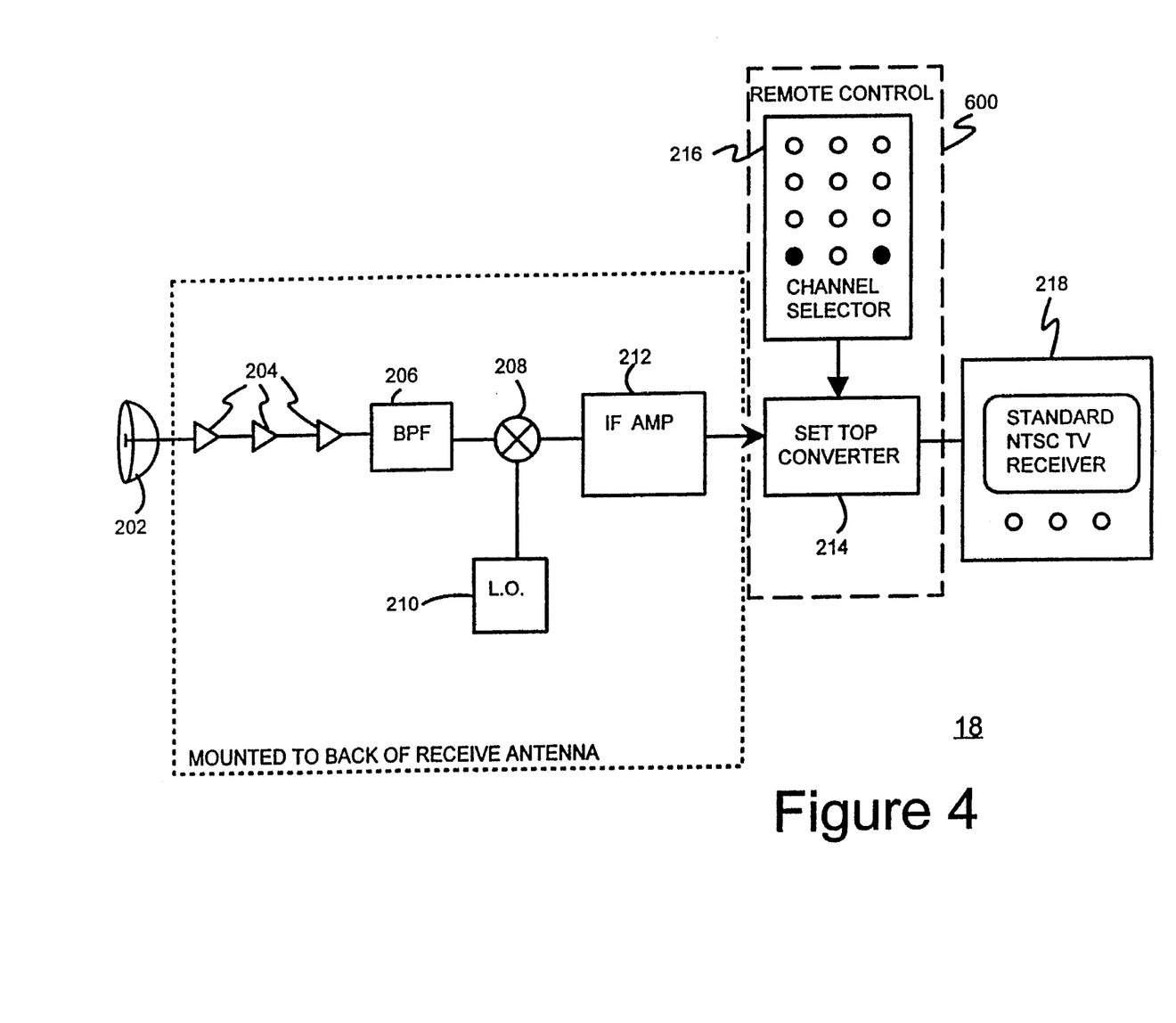
FIG. 4 is a block diagram of a first embodiment of a subscribe receive only site that provides for one-way communication utilized in the present invention.

A subscriber receiver 18, as shown in FIG. 1 is utilized to receive signals from one of the above identified head end transmitter configurations to provide one way communication. Referring now to FIG. 4, what is shown is a block diagram of a subscriber receiver 18 which could be utilized for one way communication from the head end transmitting site 12 and head end transmitting site 12' described above. In this embodiment, a receive antenna 202, preferably a planar or parabolic antenna, is coupled to a preamplifier 204 in this embodiment a three stage preamplifier.

The preamplifier 204 in turn is coupled to a band pass filter (BPF) 206. The BPF 206 in turn is coupled to a mixer 208 which is utilized to convert the received signal to an intermediate frequency (IF) while providing image rejection. A local oscillator 210 is utilized to obtain the proper IF output range out of the mixer 208. The mixer 208 provides the signals to an amplifier 212 which provides the signals at intermediate frequencies to a set top converter 214 of a subscriber interface device 600. The set top converter 214 either under control of remote control channel selector 216 or directly controls the operation of the television receiver 218.

In a preferred embodiment, the set top converter 214 is fed the optimum incoming RF signal through a highly directive planar or parabolic antenna 202. This narrow reception lobe provides all the reception gain and orientation selectivity that is nominally required even during periods of high winds and normal rainfall. Multipath distortion, insufficient co-channel isolation and other interference rejections are built-in assets of the fine tuning subscriber receive antenna installation procedures.

The above-identified head end transmitting sites 12 and 12' and subscriber receiver 18 operate effectively for one way communication. A system in accordance with the present invention also will work effectively for two way communication.

Figure 5:
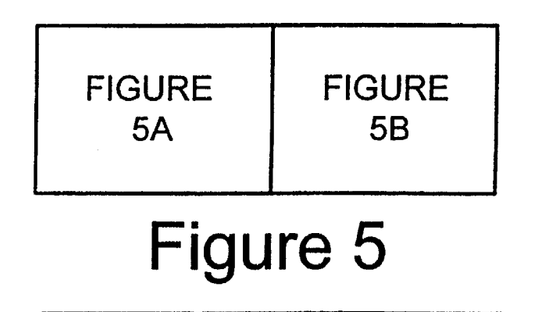
FIG. 5 is a block diagram of an embodiment of a head end duplex (remote) transmitter that provides for two-way communication utilized in the present invention.
Figure 5A:
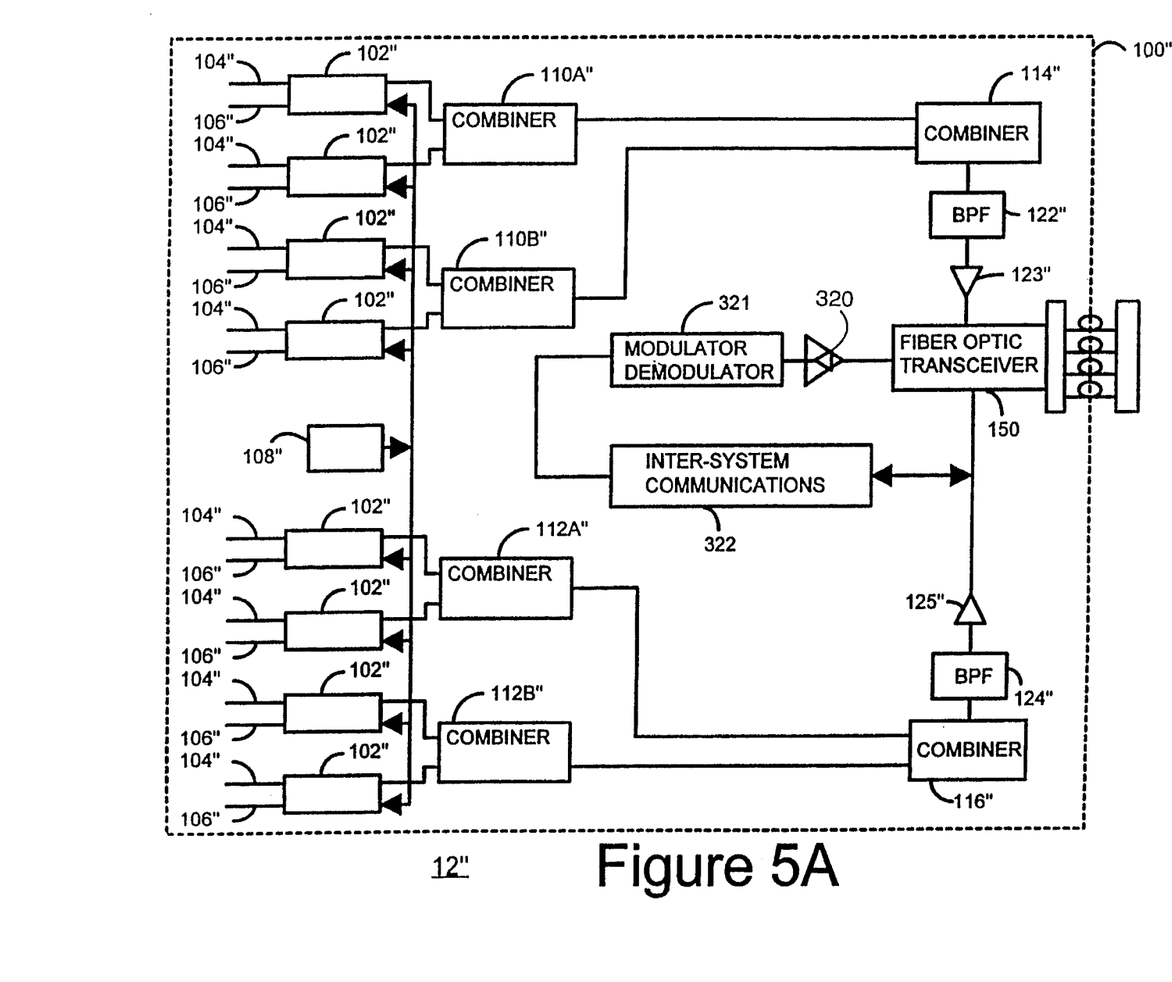
Figure 5B:
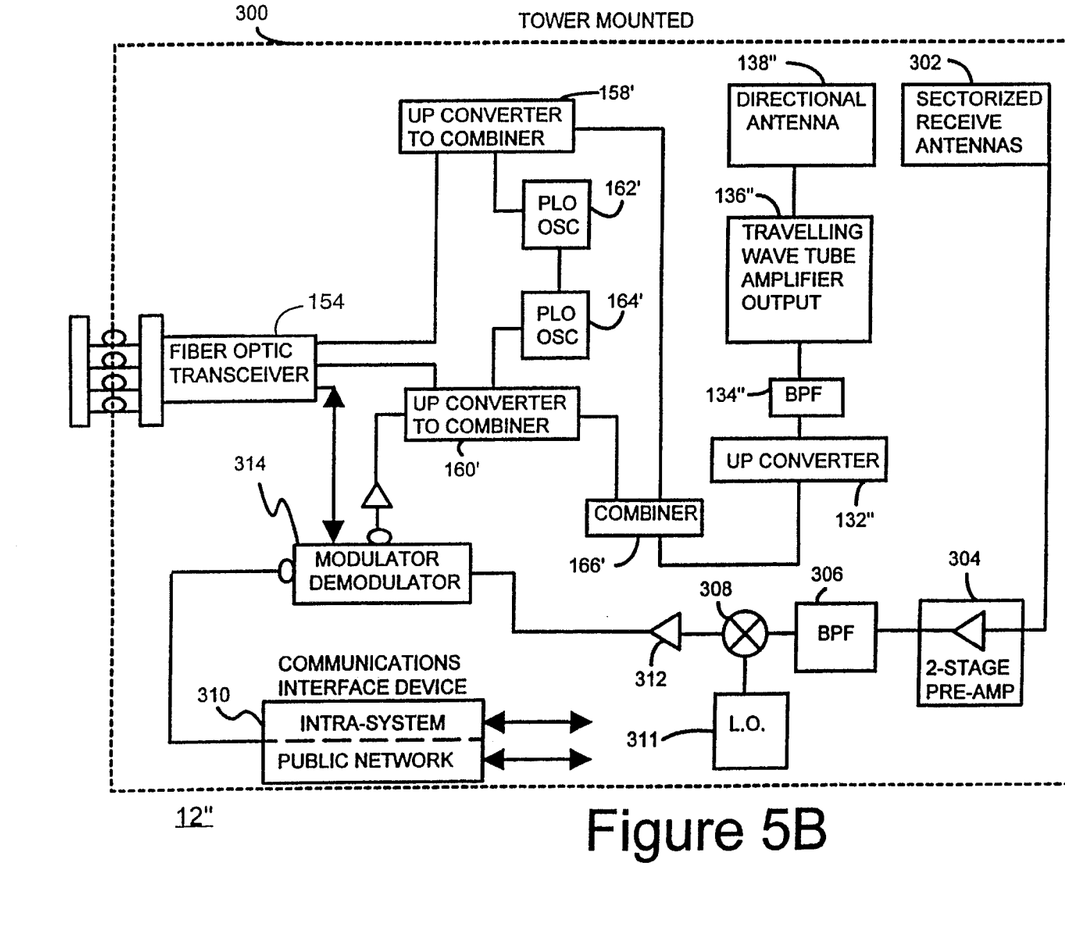

To explain this feature of the present invention refer first to FIG. 5 which shows a block diagram of a head end duplex (remote) transmitting site 12" which could be utilized for two way communication. The duplex transmitting site 12" has many of the same elements as described in relation to the head end transmitting site 12' of FIG. 3 and has common reference numerals. The head end duplex remote transmitter site 12" includes an antenna receiver portion 300. In this embodiment a sectorized receive antenna 302, preferably a parabolic antenna is coupled to a preamplifier 304, in this instance a two stage preamplifier, of the receive portion. The preamplifier 304 in turn is coupled to a band pass filter (BPF) 306. The BPF 306 in turn is coupled to a mixer 308 which is utilized to convert the received signal to an IF while providing image rejection. A local oscillator 311 is utilized to obtain the proper IF output frequency range of the mixer 308. The mixer 308 provides the signals to an amplifier 312 which provides the signals at some intermediate frequency to a modulator/demodulator 314.

The demodulator portion of the modulator/demodulator 314 converts the received IF signal to a multiplexed baseband signal. This signal is fed to a communications interface device 310 for distribution to the public network (received voice, data, facsimile, etc. services) and to the intra-system network (pay TV requests, etc.). The signal from the demodulator 314 is also fed through the combiner 160' to the fiber transceiver 154, over fiber to fiber transceiver 150 to a two-way amplifier 320. The signal is then routed through the demodulator portion of the modulator/demodulator 321 which converts the multiplexed signal to a baseband that is routed through the intra-system communications unit 322 within the head-end (for use in system operation, etc.).

Operating signals from the head-end (authorization to receive HBO for set-tops, etc.) will be input to the intra-system communications unit 322 and routed through the modulator portion of the modulator/demodulator 321 and then through the two-way amplifier 320. The signal is then fed to the fiber transceiver 150 and then to fiber to fiber transceiver 154. The signal is then routed to modulator 314. The signals from both the public network and the intra-system network are received into the communications interface device 310 and fed to the modulator portion of the modulator/demodulator 314. The modulator converts these signals to IF and routes them to the combiner 166' for transmit, along with the video through up-converter 132", BPF 134" traveling wave tube amplifier 136";, and out to the subscriber receivers 18' through antenna 138" therefrom to allow for two-way communication.

Figure 6:
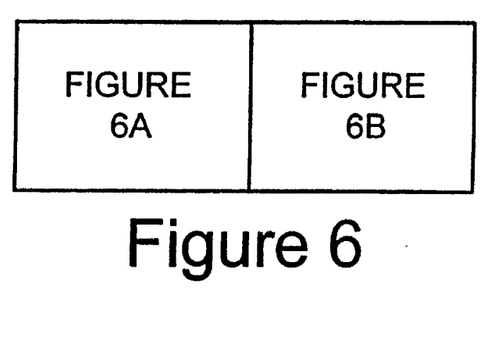
FIG. 6 is a block diagram of a first embodiment of a subscriber duplex receiver that provides for two-way communication utilized in the present invention.
Figure 6A:
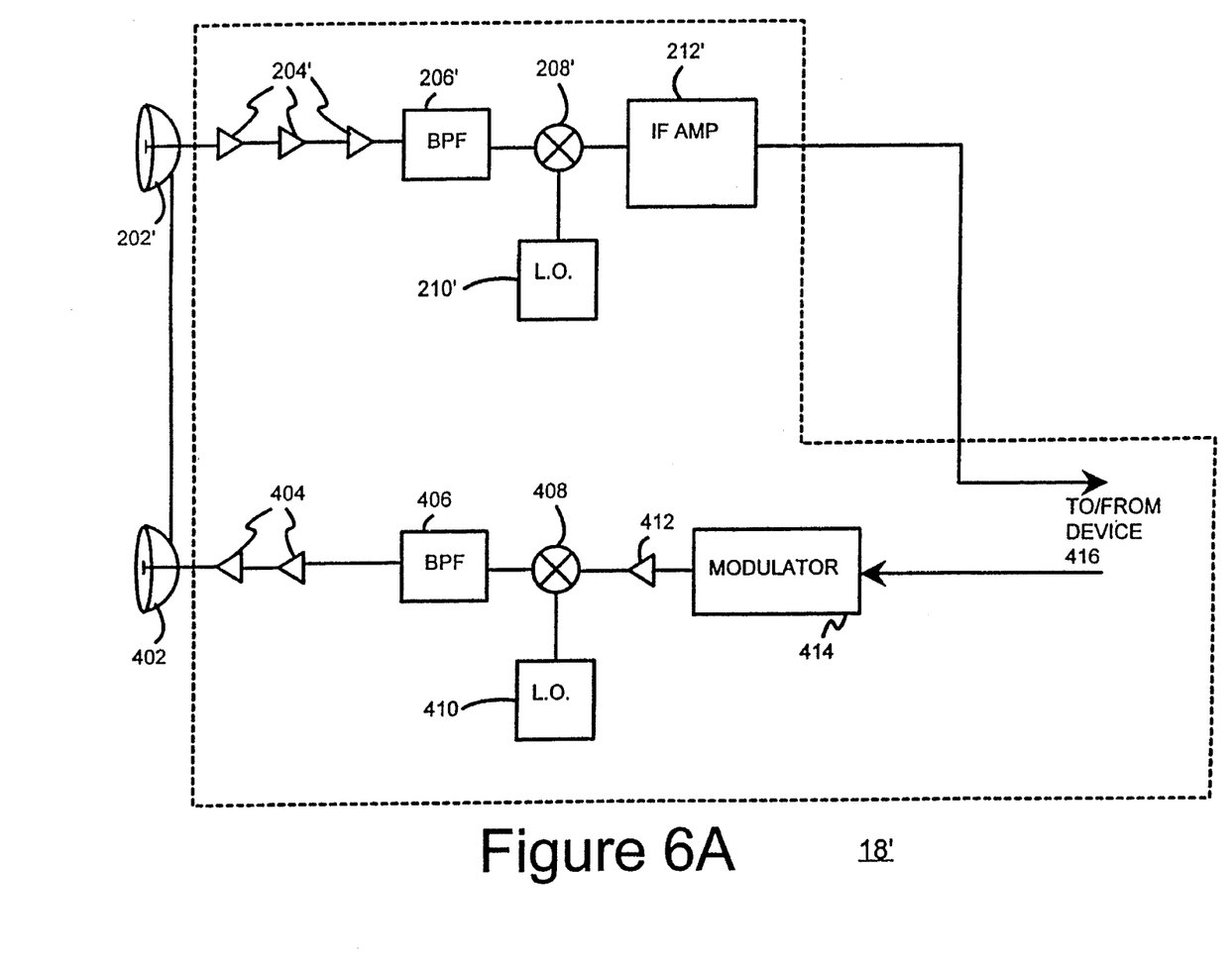
Figure 6B:
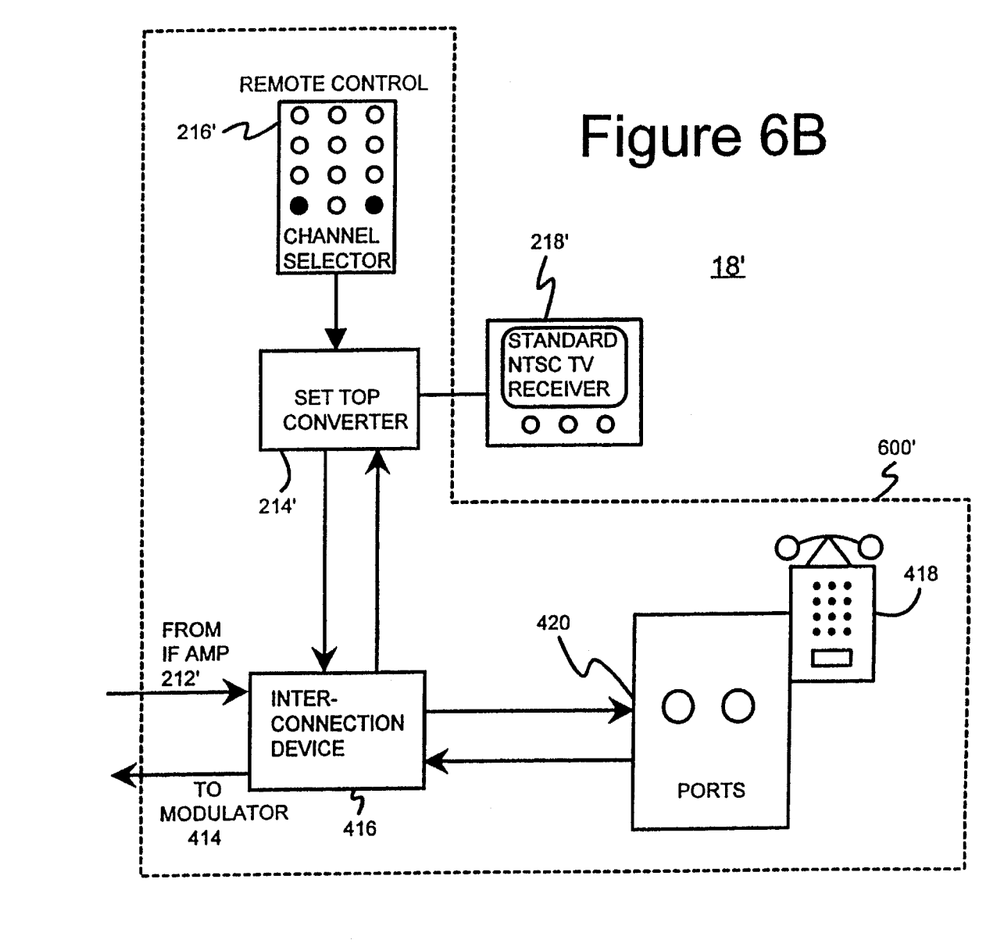

This type of transmitting site 12" could be utilized with the subscriber duplex site 18' shown in FIG. 6. The subscriber duplex site 18' has many of the same elements as described in relation to the subscriber receiver 18 of FIG. 4 and has common reference numerals. Accordingly, the subscriber duplex site 18' can be utilized for one-way incoming signal reception via a first antenna 202' and it includes a capability for transmitting a return signal via second antenna 402.

The first antenna 202' being identical to the antenna 202 of FIG. 4, is used for subscriber receiving only, while the second antenna 402 is used for subscriber transmitting only. The second antenna 402 is a separate directional antenna array similar to the first antenna 202'. These two antennas are mechanically aligned and locked together to allow alignment based on the receive signal only. The second antenna 402 is coupled to an amplifier 404.

The amplifier 404 in turn is coupled to a band pass filter (BPF) 406. The BPF 406 in turn is coupled to a mixer 408 which is utilized to convert the received signal to IF while providing image rejection. An oscillator 410 is utilized to obtain the proper IF output frequency range of the mixer. The mixer 408 receives amplified signals from amplifier 412 via modulator 414. The modulator 414 in turn receives signals from the set top converter 214' of the subscriber interface device 600' via a subscriber interconnection device 416.

The set-top converter 214' of the subscriber interface device 600' also responds to a telephone handset 418 including a dialing pad built into the handle for use at the set top converter 214'. Ports 420 are utilized for patching in a remotely located telephone handset plus an additional instrument, such as a telephone answering machine or a two-way facsimile machine.

Figure 7:
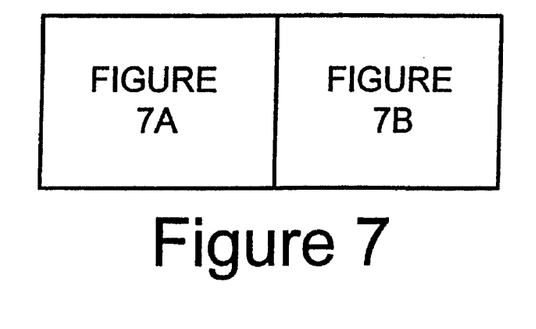
FIG. 7 is a block diagram of a second embodiment of a subscriber duplex receiver that provides for two-way communication utilized in the present invention.
Figure 7A:
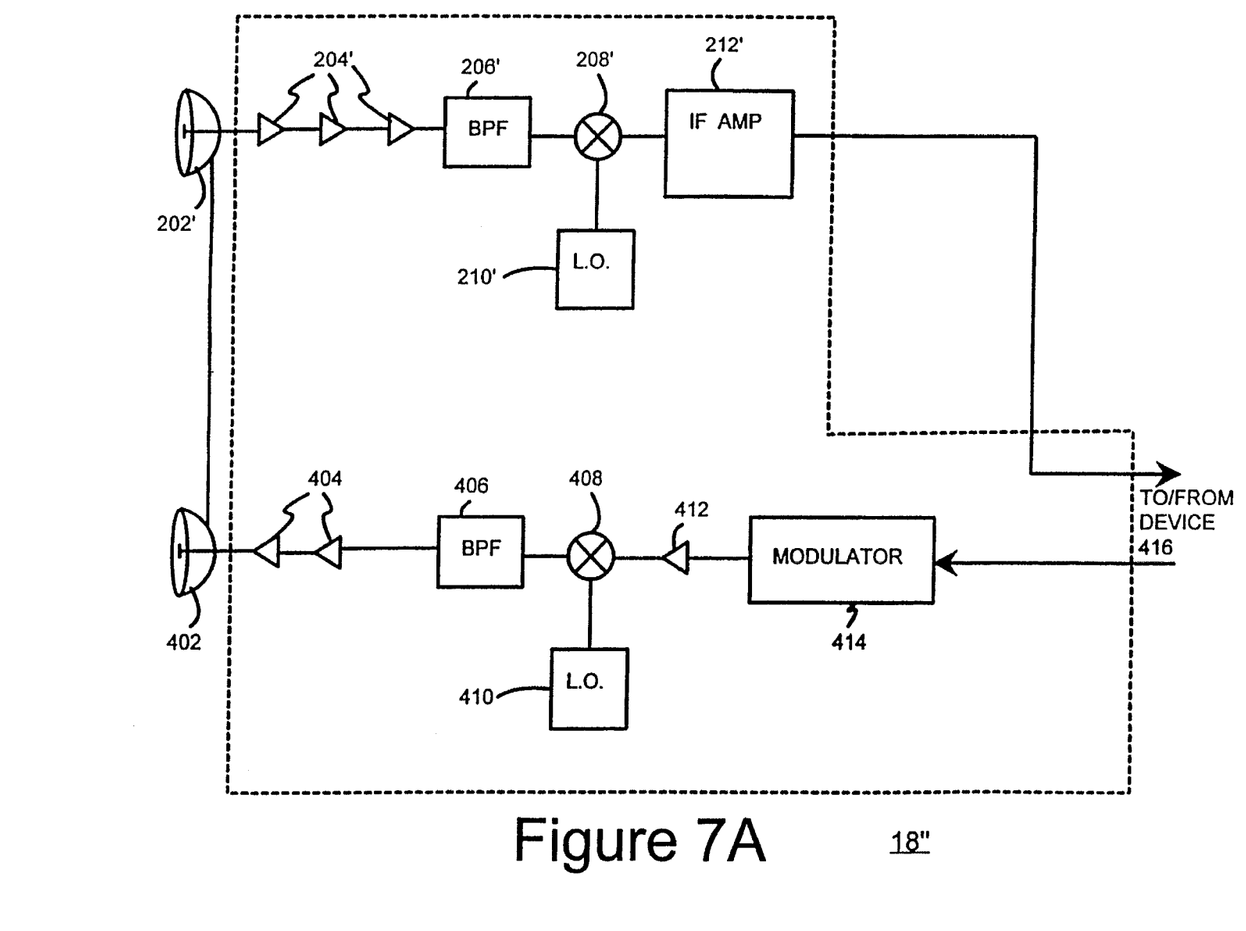
Figure 7B:
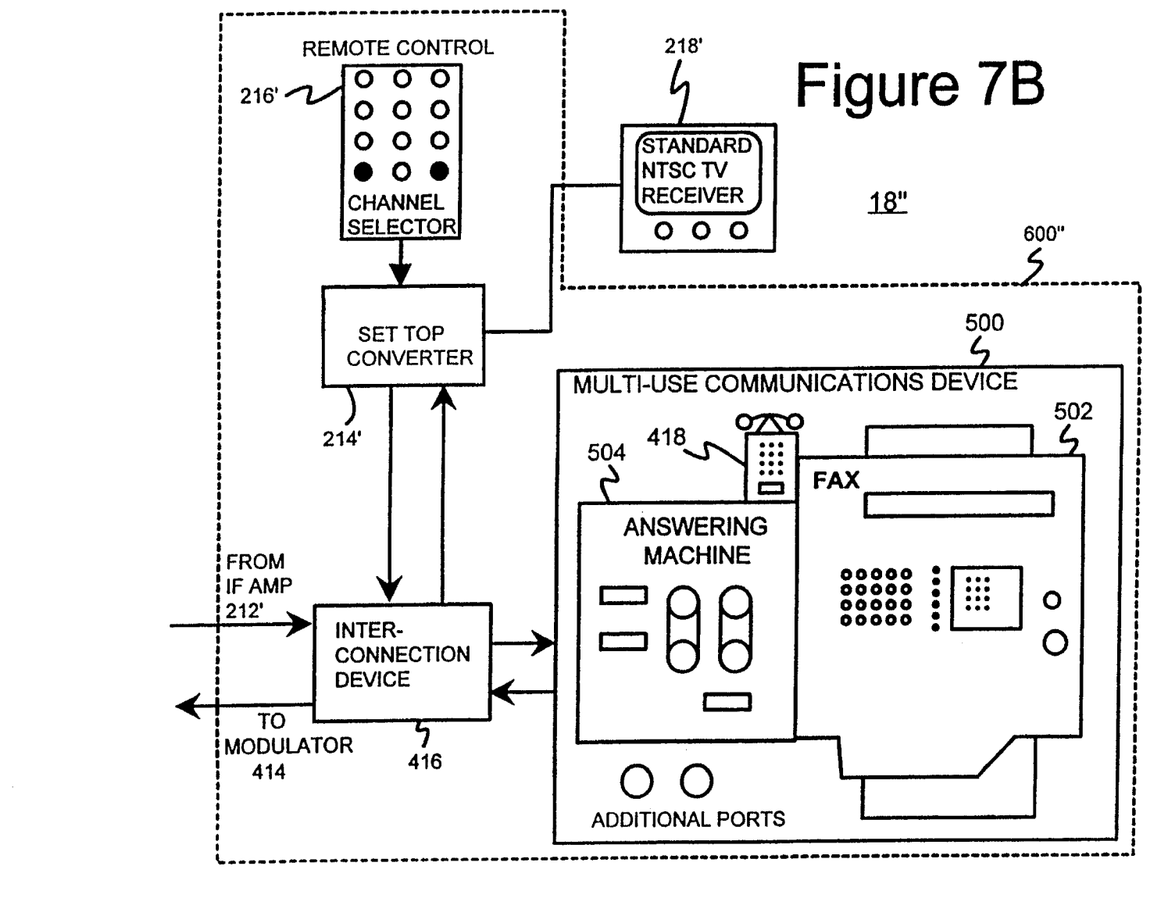

In another embodiment shown in FIG. 7, a block diagram of a receiver 18" is shown that duplicates all the features shown in FIG. 6, but in addition, the subscriber interface device 600" includes a built-in combination two-way facsimile machine 502 plus a telephone answering machine 504.

In a broadcasting system 100 in accordance with the present invention, both the head end transmitter antenna 128 and the subscriber receiver antenna 202 can be polarized and can be used in the horizontal, vertical or circular modes. They can be used at intermediate polarization angles. For example:
0° to 180° (Vertical)
30° to 210°
60° to 240°
90° to 270° (Horizontal)
120° to 300°
150° to 330°

Accordingly it has been demonstrated that by utilizing these various receivers 18, and 18' and head end transmitting sites 12, 12' and 12" as above described broadcasting system in accordance with the present invention can provide one-way incoming signal reception only; one-way incoming signal reception plus an outgoing return capability providing audio, video or telemetry modulation (or any combination thereof) using AM, FM, Digital or Single Sideband modulation (or any combination thereof).

This system also allows for telephone and other two-way interactive services such as facsimile and computer networking services, games of skill, telebanking, teleshopping, teleconferencing and Pay-per-View television program services. In addition, as has been above-described a built-in two-way facsimile communications system and a telephone answering machine for incoming calls to a receiver can also be very effectively utilized by the system in accordance with the present invention.

Although the present invention has been described in accordance with the embodiments shown in the figures, one of ordinary skill in the art recognizes there could be variations to the embodiments and those variations would be within the spirit and scope of the present invention. Accordingly, many modifications may be made by one of ordinary skills in the art without departing from the spirit and scope of present invention, the scope of which is defined solely by the appended claims.

We claim:

1. A non-cellular, line-of-sight broadcast system for providing programming services to subscriber receivers in a unitary service area, comprising:

a plurality of spaced apart transmitter sites, each site having a transmitter and a directional transmit antenna, each said transmit antenna having a directional, line-of-sight radiated pattern focused toward said service area, all of said transmitters broadcasting on the same carrier frequency, said carrier frequency greater than one gigahertz, a programming feed system connected to each of said transmitters for providing a substantially identical programming signal for broadcast by each of said transmit antennas, and a plurality of said subscriber receivers at respective fixed sites in said service area, a first group of said subscriber receivers having the directional receiving antennas thereof focused toward a first of said transmit antennas which first transmit antenna provides the best reception of said programming signal for the subscriber receivers in said first group and a second group of said subscriber receivers having the directional antennas thereof focused toward a second of said transmit antennas which second transmit antenna provides the best reception of said programming signal for the subscriber receivers in said second group.

2. A non-cellular, line-of-sight broadcast system as recited in claim 1 wherein said transmitter sites are positioned around the periphery of said service area and the radiated pattern for each said transmit antenna has a beamwidth sufficiently broad to substantially encompass said service area.

3. A non-cellular, line-of-sight broadcast system as recited in claim 1 including:

each transmitter site including collocated programmed exciters and processing equipment for producing said programming signal which includes multi-channel programming, and each said transmitter site including a frequency up converter and a power amplifier wherein said programming signal is provided to said frequency up converter which has the output thereof provided to said power amplifier which has the output thereof connected to the corresponding one of said transmit antennas.

4. A non-cellular, line-of-sight broadcast system as recited in claim 1 including:

a fixed remote location have collocated programmed exciters and processing equipment for producing at least one combined programming feed signal, and each said transmitter site including a frequency up converter and a power amplifier wherein said at least one feed signal is provided as said programming signal to said frequency up converter which has the output thereof provided to said power amplifier which has the output thereof connected to the corresponding one of said transmit antennas.

5. A non-cellular, line-of-sight broadcast system as recited in claim 4 including at least one fiber optic line for carrying said feed signal from said remote location to one of said transmitter sites.

6. A non-cellular, line-of-sight broadcast system as recited in claim 1 wherein there are at least three of said transmitter sites and said transmitter sites are spaced about said service area.

7. A non-cellular, line-of-sight broadcast system for providing service to subscriber receivers in a unitary service area, comprising:

a plurality of spaced apart transmitter sites, each site having a transmitter and a directional transmit antenna, each said transmit antenna having a directional, line-of-sight radiated pattern focused inward toward said service area, and each transmitter site having at least one directional receive antenna focused toward said service area for receiving a subscriber signal, all of said transmitters broadcasting on the same carrier frequency, said carrier frequency greater than one gigahertz.

a programming feed system connected to each of said transmitters for providing a substantially identical programming signal for broadcast by each of said transmit antennas, and a plurality of said subscriber receivers at respective fixed sites in said service area, a first group of said subscriber receivers having the directional receiving antenna thereof focused toward a first of said transmit antennas which first transmit antenna provides the best reception of said programming signal for the subscriber receivers in said first group and a second group of said subscriber receivers having the directional antennas thereof focused towed a second of said transmit antennas which second transmit antenna provides the best reception of said program signal for the subscriber receivers in said second group, and each said subscriber receiver having a directional transmit antenna focused toward a one of said transmitter sites for transmitting said subscriber signal to one of said directional receive antennas at said one of said transmitter sites.

8. A non-cellular, line-of-sight broadcast system as recited in claim 7 wherein said transmitter sites are positioned around the periphery of said service area and the radiated pattern for each said transmit antenna has a beamwidth sufficiently broad to substantially encompass said service area.

9. A non-cellular, line-of-sight broadcast system as recited in claim 7 including:

each transmitter site including collocated programmed exciters and processing equipment for producing said programming signal which includes multi-channel programming, and each said transmitter site having a frequency up converter and a power amplifier wherein said programming signal is provided to said frequency up converter which has the output thereof provided to said power amplifier which has the output thereof connected to the corresponding one of said transmit antennas.

10. A non-cellular, line of sight broadcast system as recited in claim 7 including:

a fixed remote location having collocated programmed exciters and processing equipment for producing at least one combined programmed feed signal, and each said transmitter site including a frequency up converter and a power amplifier wherein said at least one feed signal is provided as said programming signal to said frequency up converter which has the output thereof provided to said power amplifier which has the output thereof connected to the corresponding one of said transmit antennas.

11. A non-cellular, line-of-sight broadcast system as recited in claim 10 including at least one fiber optic line for carrying said feed signal from said remote location to one of said transmitter sites.

12. A non-cellular, line-of-sight broadcast system as recited in claim 7 wherein there are at least three of said transmitter sites and said transmitter sites are spaced about said service area.

13. A non-cellular, line-of-sight broadcast system as recited in claim 7 including a plurality of said directional receive antennas at each of said transmitter sites and which receive antennas are each directed to a different sector of said service area.

* * * * *

UNITED STATES PATENT AND TRADEMARK OFFICE
CERTIFICATE OF CORRECTION

PATENT NO. : 5,594,937
DATED : Jan. 14, 1997
INVENTOR(S) : Walter J. Stiles, et al It is certified that error appears in the above-identified patent and that said Letters Patent is hereby corrected as shown below:

Col. 8, line 53 - after "focused", insert --inward--.

Col. 9, line 27 - change "exciters" to --exiter--.

Col. 10, line 3 - change "antenna" to --antennas--.

Col. 10, line 9 - change "towed" to --toward--.

Col. 10, line 11 - change "program" to --programming--.

Col. 10, line 38 - change "exciters" to --exiter--.

Signed and Sealed this

Twelfth Day of January, 1999

Attest:

Attesting Officer

*Acting Commissioner of Patents and Trademarks*